(12) United States Patent
Wang et al.

(10) Patent No.: US 7,515,692 B2
(45) Date of Patent: Apr. 7, 2009

(54) SYSTEM AND METHOD FOR QUALIFYING TELEPHONE LINES FOR VERY-HIGH-BIT-RATE DIGITAL SUBSCRIBER LINE SERVICE

(75) Inventors: Jin Wang, Walnut Creek, CA (US); Ganeshan Krishnamurthi, Danville, CA (US); Raghvendra Savoor, Walnut Creek, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 275 days.

(21) Appl. No.: 11/288,603

(22) Filed: Nov. 29, 2005

(65) Prior Publication Data
US 2007/0121793 A1 May 31, 2007

(51) Int. Cl.
*H04M 1/24* (2006.01)
*H04M 3/08* (2006.01)
*H04M 3/22* (2006.01)

(52) U.S. Cl. ............... 379/27.01; 379/1.04; 379/24; 379/399.01

(58) Field of Classification Search ............... 379/1.03, 379/1.04, 24, 27.01, 399.01, 1.01, 103, 15.03, 379/21, 22, 22.01, 22.03, 22.08, 25, 28; 348/180
See application file for complete search history.

(56) References Cited

U.S. PATENT DOCUMENTS

| | | | |
|---|---|---|---|
| 6,266,395 | B1 | 7/2001 | Liu et al. |
| 6,380,971 | B1 * | 4/2002 | Brodigan ............ 348/180 |
| 6,456,694 | B1 | 9/2002 | Posthuma |
| 6,538,451 | B1 | 3/2003 | Galli et al. |
| 6,707,886 | B2 | 3/2004 | Erving et al. |
| 2002/0067802 | A1 * | 6/2002 | Smith et al. ........... 379/1.04 |
| 2002/0122552 | A1 * | 9/2002 | Liu ................ 379/399.01 |
| 2003/0235274 | A1 * | 12/2003 | Afzal ............... 379/1.04 |

* cited by examiner

*Primary Examiner*—Ahmad F Matar
*Assistant Examiner*—Nafiz E Hoque
(74) *Attorney, Agent, or Firm*—Brinks Hofer Gilson & Lione

(57) ABSTRACT

A method for qualifying a telephone line for very-high-bit-rate digital subscriber line ("VDSL") service is disclosed. Generally, a telephone line for VDSL service is prequalified based on a length of the telephone line. A VDSL rate of the telephone line is measured and it is determined whether to qualify as VDSL data qualified based on the measured VDSL rate and a VDSL rate threshold. A VDSL video quality of the telephone line is measured and it is determined whether to qualify the telephone line as VDSL video qualified based on the measured VDSL video quality. Finally, a network database is updated with the determined VDSL data and video qualifications of the telephone line.

17 Claims, 7 Drawing Sheets

SYSTEM AND METHOD FOR QUALIFYING TELEPHONE LINES FOR VERY-HIGH-BIT-RATE DIGITAL SUBSCRIBER LINE SERVICE

BACKGROUND

Very-high-bit-rate digital subscriber line ("VDSL") service is currently one of the highest speed digital subscriber line ("DSL") services, with asymmetric rates up to 50 Mb/s downstream and 6.4 Mb/s upstream. However, to sustain VDSL service, VDSL loops are typically very short such that optical fiber may be used for all but the least few thousand feet. Due to the increasing popularity of VDSL service due to its higher bit rates, it is desirable to have an accurate and efficient method for testing of potential VDSL lines.

DETAILED DESCRIPTION OF THE DRAWINGS

The current disclosure provides a multi-step method for a very-high-bit-rate digital subscriber line ("VDSL") service provider to qualify a telephone line for VDSL service. The disclosed VDSL qualification method provides an accurate and efficient method for testing whether a telephone line can sustain VDSL service prior to a VDSL service provider actually provisioning VDSL service to a customer over the telephone line.

Figure 1:
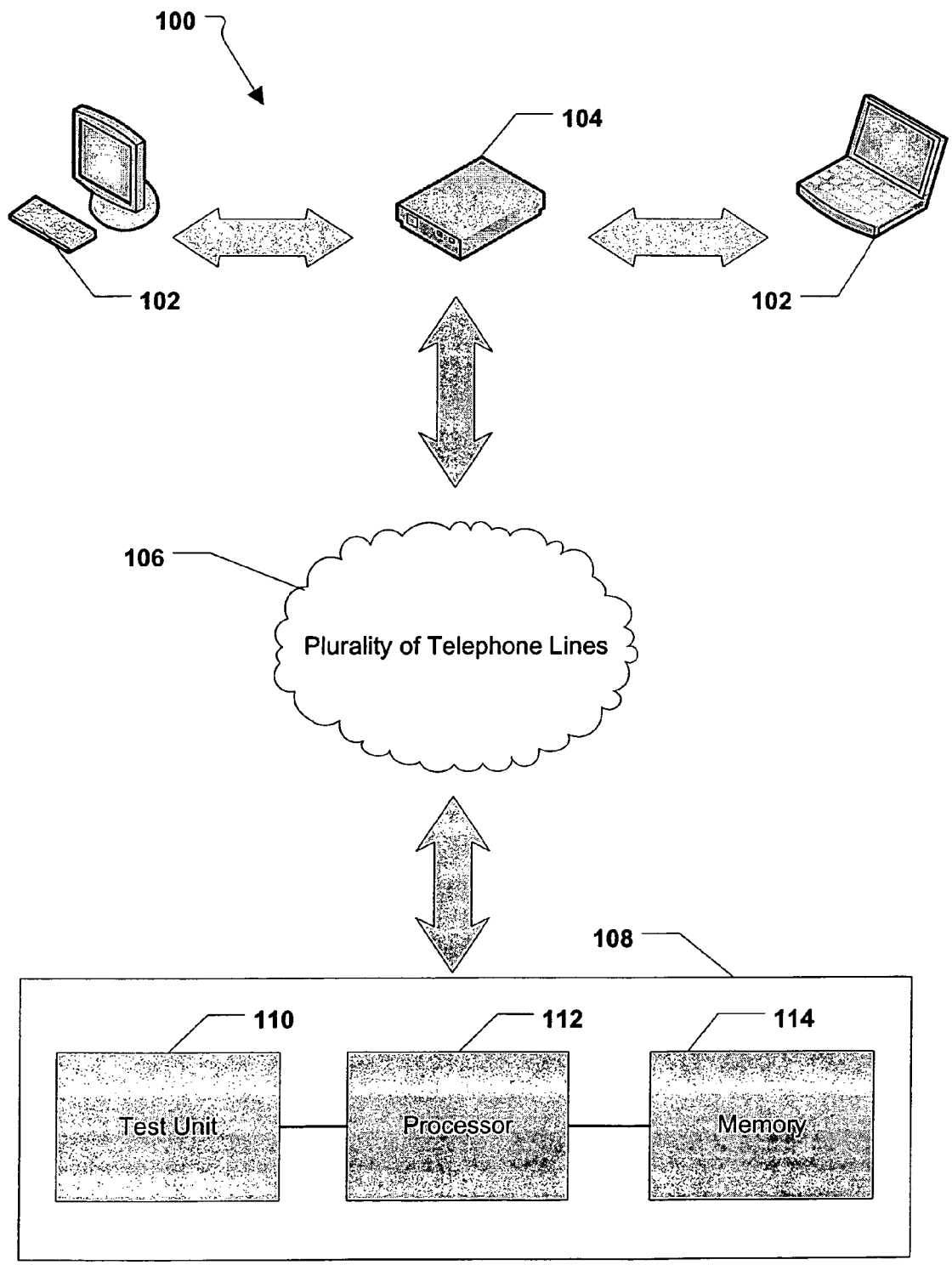
FIG. 1 is an illustrative embodiment of a typical VDSL network.

FIG. 1 is a diagram of a typical VDSL network 100. Typically, the VDSL network 100 comprises at least one user device 102; a VDSL modem 104 connected to the at least one user device 102; a plurality of telephone lines 106 connected to the VDSL modem 104; and a VDSL service provider 108 connected to the plurality of telephone lines 106. The at least one user device 102 may comprise a personal computer, a handheld device, a server, or any other device capable of network communications.

The VDSL service provider 108 may comprise one or more servers or devices operative to provide VDSL service to the at least one user device 102. One embodiment of a VDSL service provider 108 operative to execute the disclosed VDSL qualification method comprises a test unit 110, a processor 112 in communication with the test unit 110, and a memory unit 114. As described in more detail below, the test unit 110 is typically operative to measure a length, VDSL rate, and VDSL video quality of a telephone line. The processor 112 in communication with the test unit is operative to direct the test unit to measure the length, VDSL rate, and VDSL video quality of the telephone line, and to prequalify the telephone line for VDSL service based on the measured length of the telephone line and to quality the telephone line for VDSL data and video service based on the measured VDSL rate and video quality. The memory unit 114 is operative to store at least a network database comprising VDSL qualifications for a plurality of telephone lines such that the processor may store the determined qualifications of the telephone line for VDSL data and video service in the network database.

Figure 2:
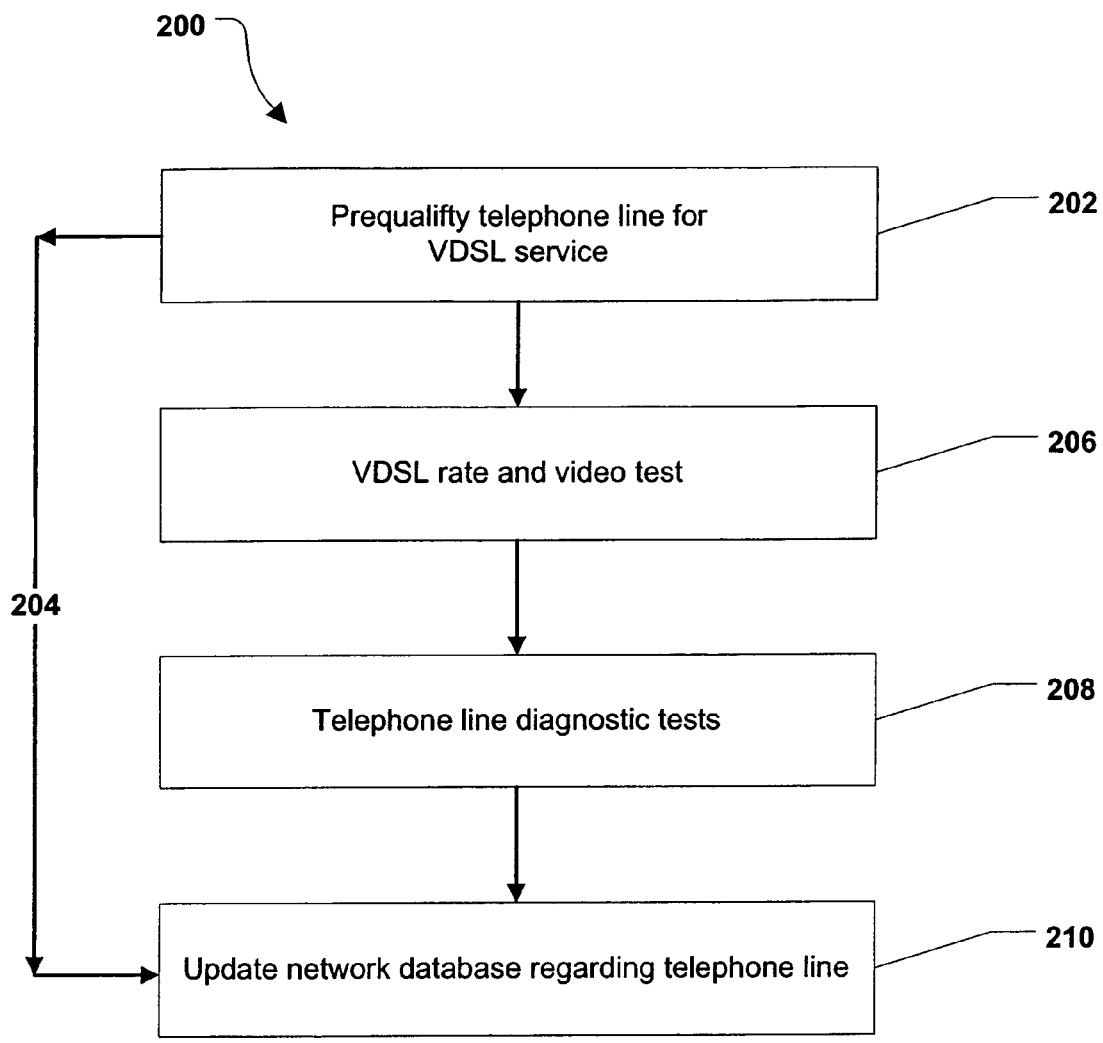
FIG. 2 is a flow diagram of one embodiment of a method for qualifying telephone lines for VDSL service.

FIG. 2 is a flow diagram of one embodiment of a method for qualifying telephone lines for VDSL service 200. Generally, the method 200 comprises four phases. In a first phase 202, a VDSL service provider determines whether a telephone line is prequalified for VDSL service based on a network database storing at least loop makeup information regarding the telephone line and VDSL line qualification information on other telephone lines neighboring the telephone line. If the telephone line is not prequalified for VDSL service during the first phase, the method 200 moves to phase four described below 204. However, if the telephone line is prequalified, the method 200 moves to phase two 206.

In phase two 206, the VDSL service provider takes direct measurements of VDSL rate and video quality of the telephone line. If the measurement for VDSL rate does not meet a predetermined VDSL rate threshold, the VDSL service provider deems the telephone line as not qualified for VDSL service and the method proceeds to phase three 208 for troubleshooting. If the measurement for VDSL rate meets the predetermined VDSL rate threshold, but the measurement for VDSL video quality does not meet a predetermined VDSL video quality threshold, the VDSL service provider deems the telephone line as qualified for VDSL data service but not for VDSL video service, and the method proceeds to phase three 208 for troubleshooting. However, if the measurement for VDSL rate meets the predetermined VDSL rate threshold and the measurement for VDSL video quality meets the predetermined VDSL video threshold, the VDSL service provider deems the telephone line as qualified for VDSL data and video service, and the method 200 moves to phase three 208 to perform diagnostic tests for optimization of VDSL service or simply record the loop condition at the time.

In phase three 208, the VDSL service provider obtains telephone line information regarding the telephone line such as insertion loss, tap location/length, line stationary noise and impulse noise. If the VDSL service provider has deemed the telephone line as not qualified for VDSL data and/or video service in phase two 206, the telephone line information obtained in phase three 208 may reveal the cause of the disqualification for VDSL service and provide the VDSL service provider the ability to repair the telephone line so that the telephone line can sustain VDSL service. After the VDSL service provider obtains the telephone line information regarding the telephone line, the method 200 moves to phase four 210.

In phase four 210, the VDSL service provider updates the network database with the results of the VDSL qualification method 200 and archives the test results of phase two 206 and phase three 208.

Figure 3:
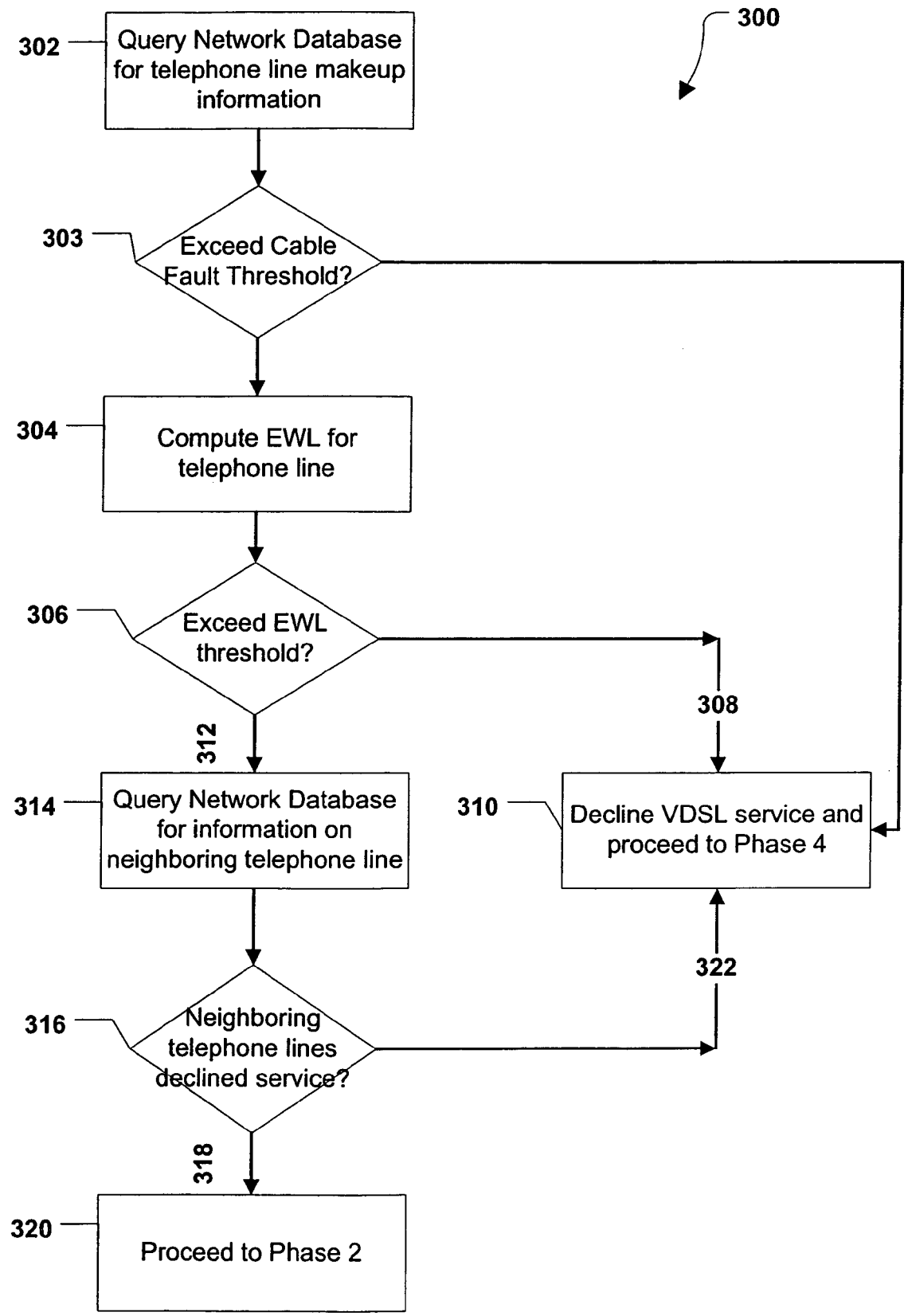
FIG. 3 is a flow diagram of one embodiment of a line prequalification phase of the VDSL line qualification method of FIG. 2.

FIG. 3 is a flow diagram of one embodiment of a telephone line prequalification phase of the VDSL line qualification method of FIG. 2. In phase one, a telephone line is generally disqualified when an Equivalent Working Length ("EWL") of the telephone line is too long or when severe electrical faults exist on the telephone line such as a high resistance open or an electrical short between two wires. The EWL of a telephone line is defined as the length of Gauge-26 Category-3 cable at 70° F. that has the same insertion loss as the telephone line at 500 kHz. Generally, the VDSL rate of a telephone line is roughly inversely proportional to an EWL of the telephone line. Therefore, any telephone line with an EWL that is longer than a predetermined threshold will likely not achieve the minimum VDSL rate allowed by a VDSL service provider and the VDSL service provider should not qualify the telephone line for VDSL service. However, due to the fact the VDSL service provider may not always have accurate information to calculate the EWL of a telephone line, the VDSL service provider may verify any prequalification/disqualification of VDSL service by querying a network database for information regarding other telephone lines neighboring the telephone line. A first telephone line may be defined to be neighboring a second telephone line if the first and second telephone lines are dropped at the same serving terminal, such as a telephone pole. The VDSL service provider examines the EWL of neighboring telephone lines due to the fact telephone lines that are dropped at the same terminal have similar EWL. Therefore, if the VDSL service provider has disqualified other neighboring telephone lines for VDSL service due to the other neighboring telephone line having too long an EWL, the VDSL service provider can verify that the telephone line has too long an EWL and should accurately be denied VDSL service.

The method of phase one 300 begins at step 302 with the VDSL service provider querying a network database for telephone line makeup information regarding a telephone line. The telephone line makeup information may comprise the wire gauge of the telephone line, the physical length of all segments of the telephone line, EWL of the telephone line, cable fault information, or any other property of a telephone line desired by the VDSL service provider.

The VDSL service provider may determine if any cable fault exists on the telephone line above the predetermined threshold for that cable fault. Examples of cable faults may include a high resistance open, an electrical short between two telephone lines, or any other cable fault known in the art. If any cable fault exceeds the predetermined threshold for that cable fault, the VDSL service provider determines the telephone line should not sustain VDSL service and the method 300 proceeds to phase four 310 of the VDSL line qualification method of FIG. 2. However, if no cable fault exceeds the predetermined threshold, the method proceeds to step 304.

The VDSL service provider may calculate an EWL for the telephone line 304 based on the retrieved telephone line makeup information if no EWL information is directly available and compare the calculated EWL to a predetermined EWL threshold 306. The predetermined EWL threshold is typically set by the VDSL service provider and may be a minimum value at which the VDSL service provider has determined the telephone line may sustain minimal VDSL service. Alternatively, the predetermined threshold may be any other value desired by the VDSL service provider.

If the calculated EWL exceeds the predetermined EWL threshold 308, the VDSL service provider determines the telephone line should not sustain VDSL service and the method 300 proceeds to phase four 310 of the VDSL line qualification method of FIG. 2. However, if the calculated EWL does not exceed the predetermined EWL threshold 312, the VDSL service provider determines the telephone line may sustain VDSL service and the VDSL service provider queries the network database for information on other telephone lines neighboring the telephone line 314.

The VDSL service provider determines whether other telephone lines neighboring the telephone line have been declined VDSL service due to the other neighboring telephone lines having too long an EWL 316. If the neighboring telephone lines have not been declined VDSL service due to the neighboring telephone lines having too long an EWL 318, the VDSL service provider determines the telephone line may be able to sustain VDSL service and the method 300 proceeds to phase two 320 of the VDSL line qualification method of FIG. 2. However, if the neighboring telephone lines have been declined VDSL service due to the neighboring telephone lines having too long an EWL 322, the VDSL service provider determines the telephone line should not sustain VDSL service and the method 300 proceeds to phase four 310 of the VDSL line qualification method of FIG. 2.

Figure 4:
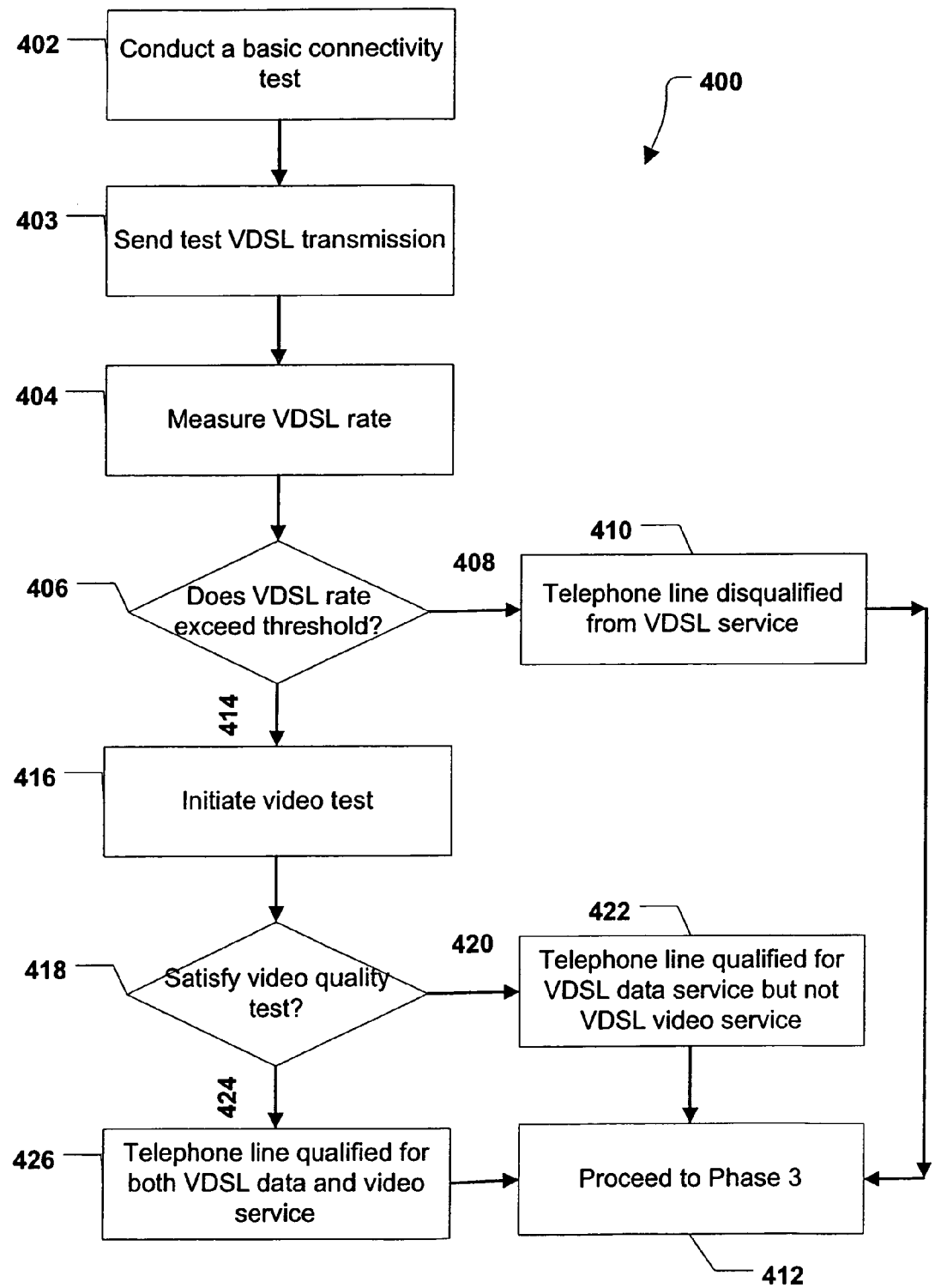
FIG. 4 is a flow diagram of one embodiment of a VDSL rate and video test phase of the VDSL line qualification method of FIG. 2.

FIG. 4 is a flow diagram of one embodiment of a VDSL rate and video test phase of the VDSL line qualification method of FIG. 2. Generally, the VDSL rate and video test phase qualify a telephone line for VDSL service by directly measuring both the VDSL rate and the video transmission quality of the telephone line. Due to the fact a high VDSL rate does not necessarily correspond to a high video quality, it is necessary to directly test both for VDSL rate and video quality.

The method 400 begins at step 402 with the VDSL service provider conducting a basic connectively test on the telephone line. The basic connectively test allows the VDSL service provider to find metallic faults that may adversely affect the quality of normal telephone service if the potential VDSL telephone service is used for VDSL service. The VDSL service provider then sends a test VDSL transmission 403 and measures the VDSL rate 404.

In one embodiment, the VDSL service provider sends a test VDSL transmission 403 and measures the VDSL rate 404 by connecting a device such as a VDSL modem, or a VDSL test unit which can emulate a VDSL test modem, to a first end of the telephone line and measuring a VDSL rate after the VDSL modem or VDSL test unit syncs up with another device such as a VDSL access multiplexer ("DSLAM"), or a VDSL test unit which can emulate a VDSL DSLAM, connected to a second end of the telephone line.

The VDSL service provider determines whether the measured VDSL rate exceeds a predetermined threshold 406. The predetermined threshold may be a data rate set by the VDSL service provider that is a minimum acceptable data rate for VDSL service, or any other value desired by the VDSL service provider. If the measured VDSL rate does not exceed the predetermined threshold 408, the VDSL service provider disqualifies the telephone line for VDSL data service and video service 410, and the method proceeds to phase three 412 of the VDSL line qualification method of FIG. 2.

However, if the measured VDSL rate exceeds the predetermined threshold 414, the VDSL service provider initiates a video test 416. The VDSL service provider then determines whether the video quality test is satisfied 418 by detecting whether the telephone line possesses an allowable video packet loss rate, or any other criterion desired by the VDSL service provider. In other embodiments, the VDSL service provider may test VDSL video quality by measuring the impulse noise in the telephone line due to the fact impulse noise one major impairment to video quality in telephone networks. Typically, impulse noise tests can be performed by DSL test equipment and VDSL modems.

If the VDSL service provider determines the video quality test is not satisfied 420, the VDSL service provider determines the telephone line is qualified for VDSL data service, but not qualified for VDSL video service 422, and the method proceeds to phase three 412 of the VDSL line qualification method of FIG. 2. However, if the VDSL service provider determines the video quality test is satisfied 424, the VDSL service provider determines the telephone line is qualified for both VDSL data and video service 426, and the method proceeds to phase three 412 of the VDSL line qualification method of FIG. 2.

Figure 5:
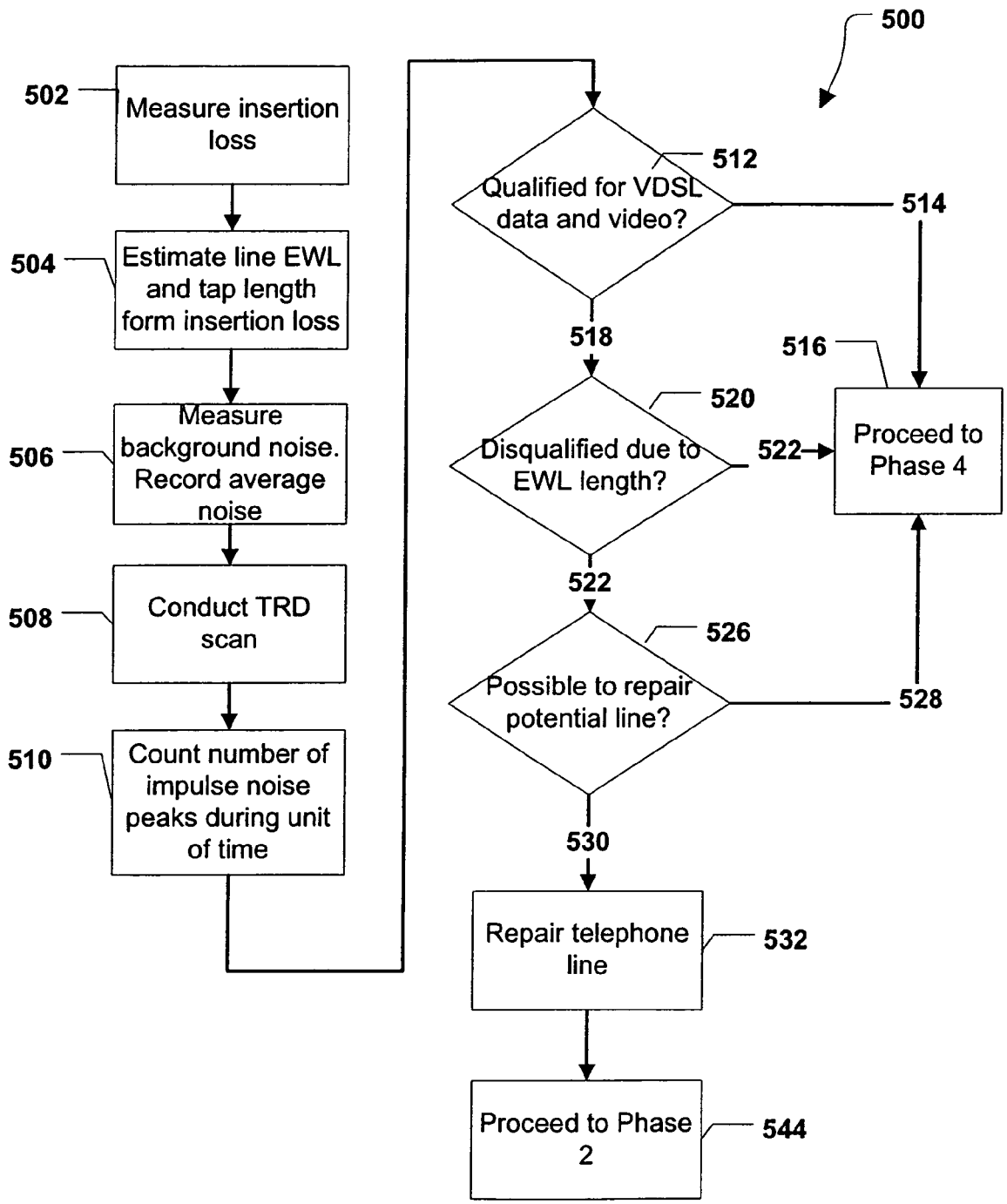
FIG. 5 is a flow diagram of one embodiment of a line diagnostic and conditioning test phase of the VSDL line qualification method of FIG. 2.

FIG. 5 is a flow diagram of one embodiment of a line diagnostic and conditioning test phase of the VSDL line qualification method of FIG. 2. Generally, the third phase of the VSDL line qualification method conducts measurements on the telephone line for the purpose of making a final determination on whether the telephone line is authorized for VDSL service, and determining whether a disqualified telephone line may be repaired to sustain VDSL service. In the third phase, the VDSL service provider may test the telephone line for insertion loss, background noise, loop impedance, impulse noise, line EWL, tap length, tap location, electrical faults, or any other property of the telephone line that would be helpful to the VDSL service provider in making a final determination on whether the telephone line is qualified for VDSL service.

If the telephone line was qualified for VDSL data and/or video service in phase 2 (FIG. 4) of the VDSL line qualification method of FIG. 2, the results of the telephone line measurements provide information to the VDSL service provider on how to optimize VDSL service on the telephone line. If the telephone line was not qualified for VDSL data and/or video service in phase 2 (FIG. 4) of the VDSL line qualification method of FIG. 2, the line measurements should provide the reasons for disqualification and may provide sufficient information to the DSL service provider for the VDSL service provider to determine whether the telephone line can be repaired to sustain VDSL service. For example, a loss measurement might alert the VDSL service provider to the existence of a bridged tap which is causing excessive line loss. In another example, a time domain reflectometry ("TDR") waveform may alert the VDSL service provider of the existence of a bridged tap or a cable fault close to a VDSL DSLAM or VDSL modem, which causes an impedance mismatch between VDSL equipment and the telephone line, resulting in high noise and excessive loop loss. In yet another example, an impulse noise test measurement may alert the VDSL service provider that video quality is poor in the telephone line due to excessive impulse noise.

The method 500 begins at step 502 with the VDSL service provider measuring line insertion loss so as to estimate loop EWL and tap length from the measured insertion loss 504. The VDSL service provider may then measure background noise at both ends of the telephone line 506; conduct a TDR scan on the telephone line 508; count a number of impulse noise peaks in a unit time 510; or perform any other measurement that may be helpful to the VDSL service provider.

The VDSL service provider then determines whether the telephone line was qualified for VDSL data and video service 512. If the telephone line is qualified for both VDSL data and video service 514, the VDSL service provider determines that the telephone line does not need to be repaired and the method proceeds to phase four 516 of the VDSL line qualification method of FIG. 2. However, if the telephone line is not qualified for VDSL data and video service 518, the VDSL service provider next determines whether the telephone line was disqualified for VDSL service due to the EWL of the telephone line exceeding the predetermined EWL threshold 520.

If the telephone line was disqualified due to the line EWL exceeding the predetermined EWL threshold 522, the VDSL service provider determines that the telephone line cannot be repaired and the method proceeds to phase four 516 of the VDSL line qualification method of FIG. 2. However, if the telephone line was not disqualified due to the line EWL exceeding the predetermined EWL threshold 524, the VDSL service provider proceeds to determine whether it is possible to repair the telephone line to sustain VDSL service 526.

If the VDSL service provider determines it is not possible to repair the telephone line for VDSL service 528 based on the telephone line makeup information regarding the telephone line, the method proceeds to phase four 516 of the VDSL line qualification method of FIG. 2. However, if the VDSL service provider determine it is possible to repair the telephone line for VDSL service 530, the VDSL service provider may repair the telephone line 532, and at 544, the method returns to phase two (FIG. 4) of the VDSL line qualification method of FIG. 2.

Figure 6:
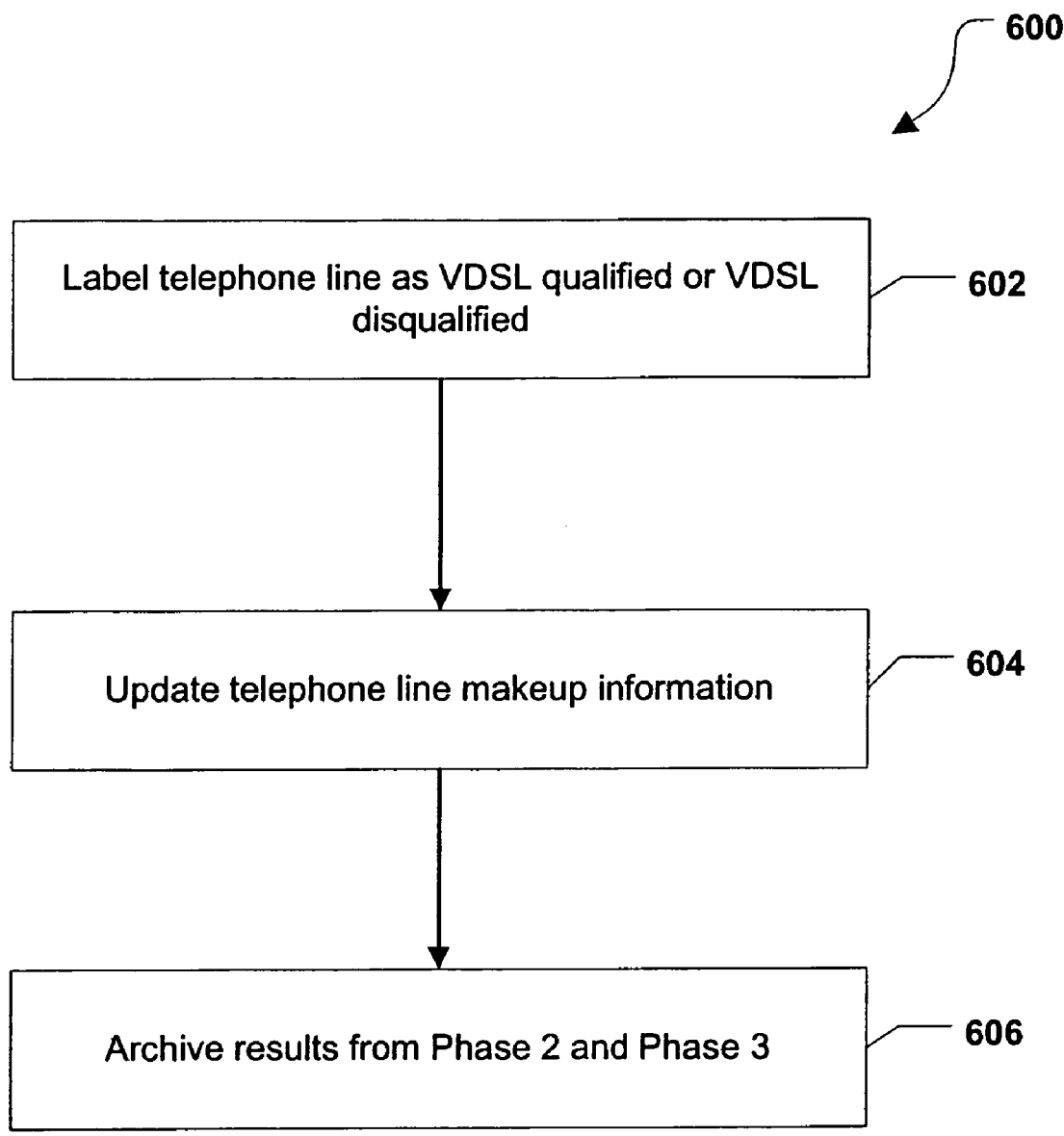
FIG. 6 is a flow diagram of one embodiment of a network database update phase of the VDSL line qualification method of FIG. 2.

FIG. 6 is a flow diagram of one embodiment of a network database update phase of the VDSL line qualification method of FIG. 2. Generally in the fourth phase the VDSL service provider updates the network database and archives the test results from the previous phases of the VDSL line qualification method of FIG. 2. Updated telephone line makeup information is important so that the VDSL service provider can efficiently optimize VDSL service over the telephone line, and so that the VDSL service provider has access to accurate telephone line makeup information for neighboring telephone lines when the VDSL service provider is performing the VDSL line qualification method of FIG. 2 for other telephone lines.

The method 600 begins at step 602 with the VDSL service provider labeling the telephone line as VDSL qualified or VDSL disqualified for VDSL data and/or video service. Further, if the telephone line is labeled VDSL disqualified for VDSL data and/or video service, the VDSL service provider indicates the primary cause of VDSL disqualification. The VDSL service provider then updates the EWL, tap information, background noise level, and impulse noise count for the telephone line 604. Finally, the test data for the VDSL rate and video test is achieved 606.

Figure 7:
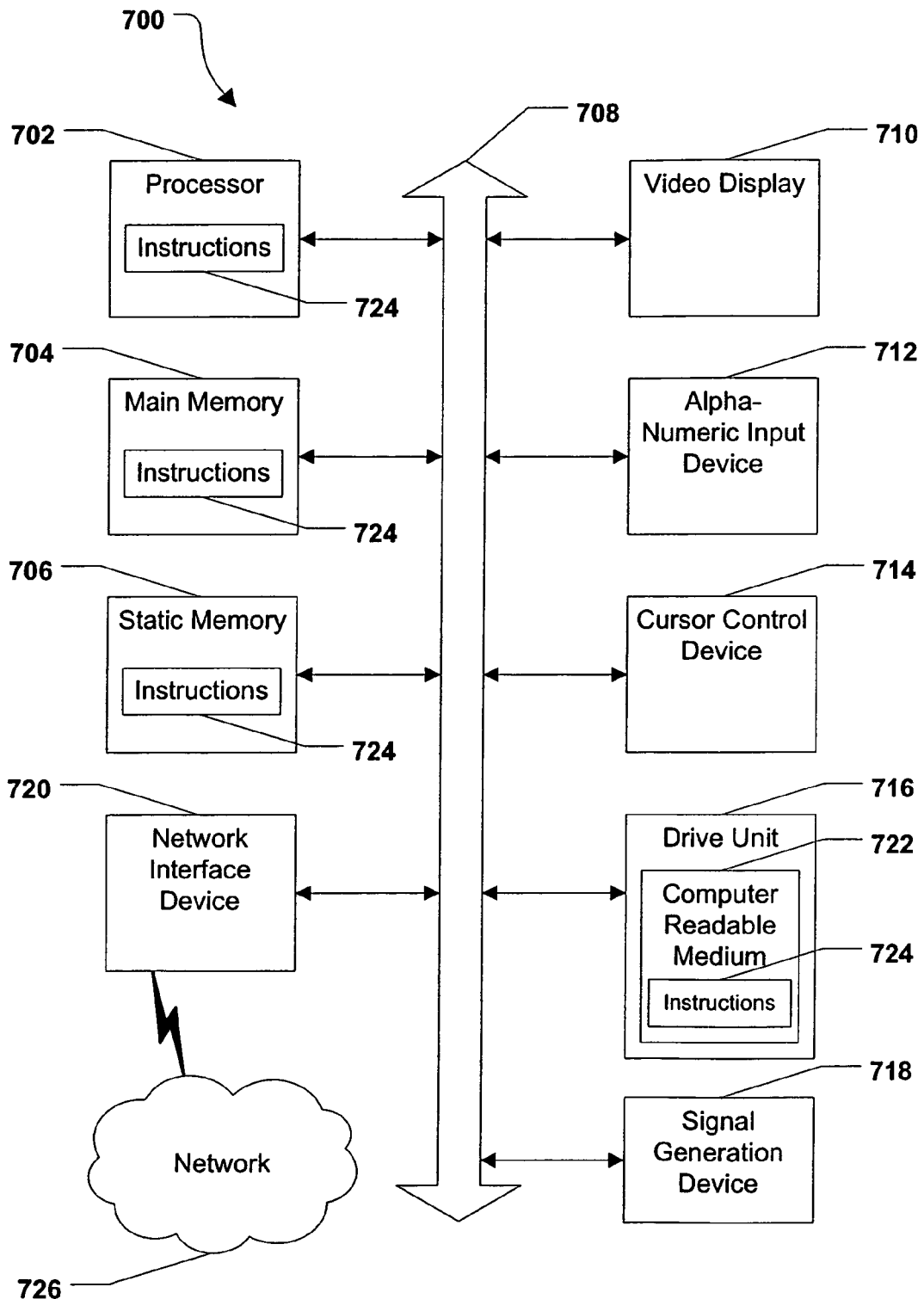
FIG. 7 is an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method for qualifying a telephone line for very-high-bit-rate digital subscriber line ("VDSL") service, comprising:
   querying a network database for an equivalent working length ("EWL") of a neighboring telephone line, the network database comprising a plurality of determined VDSL qualifications and a plurality of telephone makeup information for at least one or more telephone lines neighboring a telephone line;
   determining whether to prequalify the telephone line for VDSL service based on an EWL of the telephone line and the EWL of the neighboring telephone line;
   measuring a VDSL rate of the telephone line;
   determining whether to qualify the telephone line as VDSL data qualified based on the measured VDSL rate and a VDSL rate threshold;
   measuring a VDSL video quality of the telephone line;
   determining whether to qualify the telephone line as VDSL video qualified based on the measured VDSL video quality; and
   updating the network database with the determined VDSL data qualification and the VDSL video qualification of the telephone line.

2. The method of claim 1, wherein determining whether to prequalify the telephone line for VDSL service further comprises:
   determining whether to prequalify the telephone line for VDSL service based on the EWL length of the telephone line and an EWL threshold.

3. The method of claim 1, wherein the telephone line is qualified as VDSL data qualified if the measured VDSL rate exceeds the VDSL rate threshold.

4. The method of claim 1, wherein the telephone line is qualified as VDSL video qualified if the measured VDSL video quality exceeds a VDSL video quality threshold.

5. The method of claim 1, further comprising: qualifying the telephone line as VDSL data qualified; and qualifying the telephone line as not VDSL video qualified.

6. The method of claim 1, further comprising:
   qualifying the telephone line as not VDSL data qualified and not VDSL video qualified;
   collecting telephone makeup information regarding the telephone line; and
   determining that the telephone line can be repaired to sustain VDSL data and video service based on the collected telephone makeup information.

7. The method of claim 6, further comprising:
   repairing the telephone line to sustain VDSL data and video service; and
   repeating the steps of:
     measuring the VDSL rate of the telephone line;
     determining whether to qualify the telephone line as VDSL data qualified;
     measuring the VDSL video quality of the telephone line; and
     determining whether to qualify the telephone line as VDSL video qualified.

8. The method of claim 1, wherein the collected telephone makeup information comprises at least one of insertion loss, background noise, impedance, impulse noise, telephone line noise, tap length, tap location, power spectrum density of background noise, or count of impulse noise in a unit of time.

9. A tangible computer-readable storage medium containing a set of instructions for qualifying a telephone line for very-high-bit-rate digital subscriber line ("VDSL") service, the set of instructions to direct a computer system to perform acts of:
   querying a network database for an equivalent working length ("EWL") of a neighboring telephone line, the network database comprising a plurality of determined VDSL qualifications and a plurality of telephone makeup information for at least one or more telephone lines neighboring a telephone line;
   determining whether to prequalify the telephone line for VDSL service based on an EWL of the telephone line and the EWL of the neighboring telephone line;
   measuring a VDSL rate of the telephone line;
   determining whether to qualify the telephone line as VDSL data qualified based on the measured VDSL rate and a VDSL rate threshold;
   measuring a VDSL video quality of the telephone line;
   determining whether to qualify the telephone line as VDSL data qualified based on the measured VDSL video quality; and
   updating the network database with the determined VDSL data qualification and the VDSL video qualification of the telephone line.

10. The tangible computer-readable storage medium of claim 9, further comprising a set of instructions to direct the computer system to perform acts of:
   qualifying the telephone line as not VDSL data qualified and not VDSL video qualified;
   collecting telephone makeup information regarding the telephone line;
   determining that the telephone line can be repaired to sustain VDSL data and video service based on the collected telephone makeup information; and
   repairing the telephone line to sustain VDSL data and video service.

11. A server for qualifying a telephone line for very-high-bit-rate digital subscriber line ("VDSL") service, comprising:
   a memory for use in storing data and instructions; and
   a processor in communication with the memory, the processor operative to enable actions based on the stored instructions;
   wherein the instructions stored in the memory comprise:
     programming code for querying a network database for an equivalent working length ("EWE") of a neighboring telephone line, the network database comprising a plurality of determined VDSL qualifications and a plurality of telephone makeup information for at least one or more telephone lines neighboring a telephone line;
     programming code for determining whether to prequalify the telephone line for VDSL service based on an EWL of the telephone line and the EWL of the neighboring telephone line;
     programming code for measuring a VDSL rate of the telephone line;
     programming code for determining whether to qualify the telephone line for VDSL data service based on the measured VDSL rate and a VDSL rate threshold;

programming code for measuring a VDSL video quality of the telephone line;

programming code for determining whether to qualify the telephone line for VDSL video based on the measured VDSL video quality;

programming code for collecting telephone makeup information regarding the telephone line; and programming code for updating the network database with the determined VDSL qualifications regarding the VDSL rate and video quality of the telephone line and the collected telephone makeup information, the network database comprising a plurality of determined VDSL qualifications and a plurality of telephone makeup information for a plurality of telephone lines.

12. A server for qualifying a telephone line for very-high-bit-rate digital subscriber service ("VDSL"), comprising:

a test unit operative to measure at least an equivalent working length ("EWL"), a VDSL rate, and a VDSL video quality of a telephone line;

a processor in communication with the test unit, the processor operative to direct the test unit to:

measure the EWL, VDSL rate and VDSL video quality of the telephone line;

query a network database for an EWL of a neighboring telephone line, the network database comprising a plurality of determined VDSL qualifications and a plurality of telephone makeup information for at least one or more telephone lines neighboring the telephone line;

determine whether to prequalify the telephone line for VDSL service based on the measured EWL of the telephone line and the EWL of the neighboring telephone line; and determine whether to qualify the telephone line for VDSL data and video service based on the measured VDSL rate and video quality of the telephone line; and a memory unit coupled with the processor, the memory unit operative to store at least the network database;

wherein the processor is further operative to store the determined qualification of the telephone line for VDSL data and video service in the network database.

13. The server of claim 12, wherein the test unit is further operative to collect telephone makeup information regarding the telephone line and the processor is further operative to determine whether the telephone line can be repaired to sustain VDSL service based on the telephone makeup information of the telephone line.

14. The sever of claim 12, wherein the telephone line and the neighboring telephone line are dropped at the same serving terminal.

15. The server of claim 11, wherein the telephone line and the neighboring telephone line are dropped at the same serving terminal.

16. The tangible computer-readable storage medium of claim 9, wherein the telephone line and the neighboring telephone line are dropped at the same serving terminal.

17. The method of claim 1, wherein the telephone line and the neighboring telephone line are dropped at the same serving terminal.

* * * * *